(12) United States Patent
Jozaki et al.

(10) Patent No.: US 8,323,141 B2
(45) Date of Patent: Dec. 4, 2012

(54) CONTINUOUSLY VARIABLE TRANSMISSION AND CONTROL METHOD THEREOF

(75) Inventors: Tateki Jozaki, Yokohama (JP); Hideaki Suzuki, Yokohama (JP); Ryousuke Nonomura, Kawasaki (JP); Mamiko Inoue, Machida (JP); Seiichiro Takahashi, Isehara (JP); Tatsuo Ochiai, Oiso-machi (JP); Masato Koga, Hiratsuka (JP); Masaaki Uchida, Yokosuka (JP); Ryoji Kadono, Kawasaki (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 329 days.

(21) Appl. No.: 12/727,497

(22) Filed: Mar. 19, 2010

(65) Prior Publication Data
US 2010/0248894 A1 Sep. 30, 2010

(30) Foreign Application Priority Data

Mar. 27, 2009 (JP) ................................. 2009-79646

(51) Int. Cl.
*F16H 61/66* (2006.01)
(52) U.S. Cl. .......................................... 475/209; 477/41
(58) Field of Classification Search ................... 477/37, 477/41, 69; 475/209
See application file for complete search history.

(56) References Cited

U.S. PATENT DOCUMENTS

| | | | |
|---|---|---|---|
| 4,672,863 A | 6/1987 | Itoh et al. | |
| 4,674,359 A | 6/1987 | Hattori | |
| 4,685,358 A * | 8/1987 | Itoh | 477/41 |
| 4,793,217 A | 12/1988 | Morisawa et al. | |
| 5,820,514 A | 10/1998 | Adachi | |
| 6,314,357 B1 | 11/2001 | Kon et al. | |
| 6,821,228 B2 | 11/2004 | Aoki et al. | |
| 6,855,085 B1 | 2/2005 | Gumpoltsberger | |
| 6,932,739 B2 | 8/2005 | Miyata et al. | |
| 7,108,631 B2 | 9/2006 | Inoue et al. | |
| 7,393,306 B2 | 7/2008 | Tanaka | |
| 7,637,836 B2 | 12/2009 | Watanabe et al. | |
| 7,833,126 B2 | 11/2010 | Venter | |
| 8,055,414 B2 * | 11/2011 | Tawara | 701/52 |
| 2002/0011792 A1 * | 1/2002 | Taniguchi et al. | 315/76 |
| 2005/0085340 A1 | 4/2005 | Ishikawa et al. | |

(Continued)

FOREIGN PATENT DOCUMENTS

DE 199 41 009 A1 3/2001

(Continued)

OTHER PUBLICATIONS

U.S. Appl. No. 12/727,500, filed Mar. 19, 2010, Jozaki et al.

(Continued)

*Primary Examiner* — Sherry Estremsky
(74) *Attorney, Agent, or Firm* — Foley & Lardner LLP (57) ABSTRACT

A continuously variable transmission includes a variator capable of varying a speed ratio continuously, and a subtransmission mechanism provided in series with the variator. On the basis of an operating condition of a vehicle, a transmission controller sets a destination through speed ratio, which is an overall speed ratio of the variator and the subtransmission mechanism to be realized in accordance with the operating condition, and controls the variator and the subtransmission mechanism on the basis thereof. When shifts are prohibited in the subtransmission mechanism, the destination through speed ratio is limited to a speed ratio range that can be realized only by a shift in the variator.

3 Claims, 5 Drawing Sheets

U.S. PATENT DOCUMENTS

| | | |
|---|---|---|
| 2006/0217230 A1 | 9/2006 | Tanaka |
| 2009/0042690 A1* | 2/2009 | Tabata et al. .................. 477/5 |
| 2009/0105041 A1 | 4/2009 | McKenzie et al. |
| 2010/0248895 A1 | 9/2010 | Jozaki et al. |
| 2011/0015033 A1 | 1/2011 | Nonomura et al. |

FOREIGN PATENT DOCUMENTS

| | | |
|---|---|---|
| DE | 199 50 053 A1 | 4/2001 |
| JP | 60-037455 A | 2/1985 |
| JP | 62-181928 A | 8/1987 |
| JP | 63-125446 A | 5/1988 |
| JP | 04-307165 A | 10/1992 |
| JP | 05-079554 A | 3/1993 |
| JP | 8-178043 A | 7/1996 |
| JP | 11-51162 A | 2/1999 |
| JP | 11-108175 A | 4/1999 |
| JP | 2002-106700 A | 4/2002 |
| JP | 2006-112536 A | 4/2006 |
| JP | 2006-266320 A | 10/2006 |
| JP | 2007-092665 A | 4/2007 |
| JP | 2007-118727 A | 5/2007 |

OTHER PUBLICATIONS

U.S. Appl. No. 12/727,506, filed Mar. 19, 2010, Jozaki et al.

U.S. Appl. No. 12/727,516, filed Mar. 19, 2010, Jozaki et al.

T. Jozaki, U.S. PTO Notice of Allowance, U.S. Appl. No. 12/727,516, dated Apr. 26, 2012, 6 pages.

T. Jozaki, U.S. PTO Office Action, U.S. Appl. No. 12/727,500, dated Apr. 30, 2012, 12 pages.

U.S. Appl. No. 12/828,604, filed Jul. 1, 2010, Nonomura.

R. Nonmura, U.S. PTO Notice of Allowance, U.S. Appl. No. 12/828,604, dated Feb. 13, 2012, 17 pages.

T. Jozaki, U.S. PTO Office Action, U.S. Appl. No. 12/727,516, dated Jan. 20, 2012, 10 pages.

R. Nonomura, U.S. PTO Notice of Allowance, U.S. Appl. No. 12/828,604, dated Jun. 7, 2012, 12 pages.

T. Jozaki, U.S. PTO Notice of Allowance, U.S. Appl. No. 12/727,500, dated Jul. 11, 2012, 12 pages.

* cited by examiner

CONTINUOUSLY VARIABLE TRANSMISSION AND CONTROL METHOD THEREOF

TECHNICAL FIELD OF THE INVENTION

This invention relates to a continuously variable transmission and a control method thereof, and more particularly to a continuously variable transmission comprising a belt continuously variable speed change mechanism and a subtransmission mechanism.

BACKGROUND OF THE INVENTION

JP60-37455A discloses a continuously variable transmission in which a two-forward speed subtransmission mechanism is provided in series with a belt continuously variable speed change mechanism (to be referred to hereafter as a "variator"), and a gear position of the subtransmission mechanism is changed in accordance with an operating condition of a vehicle. Thus, an achievable speed ratio range is enlarged without increasing the size of the variator.

JP5-79554A discloses a technique for suppressing variation in an overall speed ratio (to be referred to hereafter as a "through speed ratio") of this type of continuously variable transmission including a subtransmission mechanism by rapidly downshifting the variator when changing the gear position of the subtransmission mechanism from a low-speed gear position to a high-speed gear position. In so doing, JP5-79554A suppresses speed variation in an engine and a torque converter during a shift in the subtransmission mechanism, thereby preventing shift shock caused by inertia torque from the engine and torque converter.

Further, as disclosed in JP2002-106700A, during shift control in a continuously variable transmission, a speed ratio to be realized under current operating conditions is set as a destination speed ratio, a target speed ratio, which is an intermediate target value for causing an actual speed ratio to follow the destination speed ratio at a predetermined transient response, is set, and the continuously variable transmission is controlled such that the actual speed ratio becomes the target speed ratio.

SUMMARY OF THE INVENTION

The shift control disclosed in JP2002-106700A may be applied to a continuously variable transmission including a subtransmission mechanism, and in this case, a destination through speed ratio and a target through speed ratio corresponding to a destination speed ratio and a target speed ratio respectively may be set, whereupon the variator and the subtransmission mechanism are controlled such that the actual through speed ratio becomes the target through speed ratio. If a shift is performed in the subtransmission mechanism while the actual through speed ratio is changing to the destination through speed ratio, shift shock occurring during the shift in the subtransmission mechanism can be suppressed by performing a shift in the variator such that the actual through speed ratio remains the same before and after the shift in the subtransmission mechanism, as disclosed in JP5-79554A.

However, in a continuously variable transmission including a subtransmission mechanism, shifts in the subtransmission mechanism may be prohibited in accordance with an oil temperature condition and so on. If, at this time, the destination through speed ratio is set outside a speed ratio range that can be realized only by a shift in the variator, the target through speed ratio is set on the basis of this destination through speed ratio and the actual through speed ratio is controlled accordingly, a shift becomes impossible at a point where the speed ratio of the variator reaches a Lowest speed ratio or a Highest speed ratio, and as a result, a shift operation is interrupted. During a shift, a variation speed of the variator speed ratio is normally set large, and therefore, if the variation speed suddenly decreases to zero, this rapid variation in shift speed causes shift shock.

It is therefore an object of this invention to suppress shift shock in a continuously variable transmission including a subtransmission mechanism even when shifts are prohibited in the subtransmission mechanism.

According to an aspect of the present invention, a continuously variable transmission installed in a vehicle, includes a belt continuously variable speed change mechanism (to be referred to hereafter as a "variator") capable of varying a speed ratio continuously, a subtransmission mechanism provided in series with the variator and having a first gear position and a second gear position, the second gear position having a smaller speed ratio than the first gear position, as forward gear positions, a destination through speed ratio setting unit which sets, on the basis of an operating condition of the vehicle, an overall speed ratio (to be referred to hereafter as a "through speed ratio") of the variator and the subtransmission mechanism to be realized in accordance with the operating condition as a destination through speed ratio, a target through speed ratio setting unit which sets a target through speed ratio, which is a transient target value for causing an actual value of the through speed ratio (to be referred to hereafter as an "actual through speed ratio") to follow the destination through speed ratio at a predetermined transient response, on the basis of the destination through speed ratio, a shift control unit which controls at least one of the speed ratio of the variator and the gear position of the subtransmission mechanism such that the actual through speed ratio becomes the target through speed ratio, a mode switch shifting unit which changes the gear position of the subtransmission mechanism and varying the speed ratio of the variator in an opposite direction to a speed ratio variation direction of the subtransmission mechanism when the actual through speed ratio passes a predetermined mode switch line, and a shift prohibition determining unit which determines whether or not shifts have been prohibited in the subtransmission mechanism on the basis of the operating condition of the vehicle. When shifts are determined to be prohibited in the subtransmission mechanism, the destination through speed ratio setting unit limits the destination through speed ratio to a speed ratio range that can be realized only by a shift in the variator.

According to another aspect of the present invention, a control method for a continuously variable transmission including a belt continuously variable speed change mechanism (to be referred to hereafter as a "variator") capable of varying a speed ratio continuously, and a subtransmission mechanism provided in series with the variator and having a first gear position and a second gear position, the second gear position having a smaller speed ratio than the first gear position, as forward gear positions, is provided. The method includes a destination through speed ratio setting step for setting, on the basis of an operating condition of the vehicle, an overall speed ratio (to be referred to hereafter as a "through speed ratio") of the variator and the subtransmission mechanism to be realized in accordance with the operating condition as a destination through speed ratio, a target through speed ratio setting step for setting a target through speed ratio, which is a transient target value for causing an actual value of the through speed ratio (to be referred to hereafter as an "actual through speed ratio") to follow the destination through speed ratio at a predetermined transient response, on the basis of the destination through speed ratio, a shift control step for controlling at least one of the speed ratio of the variator and the gear position of the subtransmission mechanism such that the actual through speed ratio reaches the target through speed ratio, a mode switch shifting step for changing the gear position of the subtransmission mechanism and varying the speed ratio of the variator in an opposite direction to a speed ratio variation direction of the subtransmission mechanism when the actual through speed ratio passes a predetermined mode switch line, and a shift prohibition determining step for determining whether or not shifts have been prohibited in the subtransmission mechanism on the basis of the operating condition of the vehicle. When shifts are determined to be prohibited in the subtransmission mechanism, the destination through speed ratio is limited to a speed ratio range that can be realized only by a shift in the variator in the destination through speed ratio setting step.

Embodiments and advantages of this invention will be described in detail below with reference to the attached figures.

DESCRIPTION OF THE PREFERRED EMBODIMENTS

An embodiment of this invention will be described below with reference to the attached figures. It should be noted that in the following description, a "speed ratio" of a certain speed change mechanism is a value obtained by dividing an input rotation speed of the speed change mechanism by an output rotation speed of the speed change mechanism. Further, a "Lowest speed ratio" is a maximum speed ratio of the speed change mechanism and a "Highest speed ratio" is a minimum speed ratio of the speed change mechanism.

Figure 1:
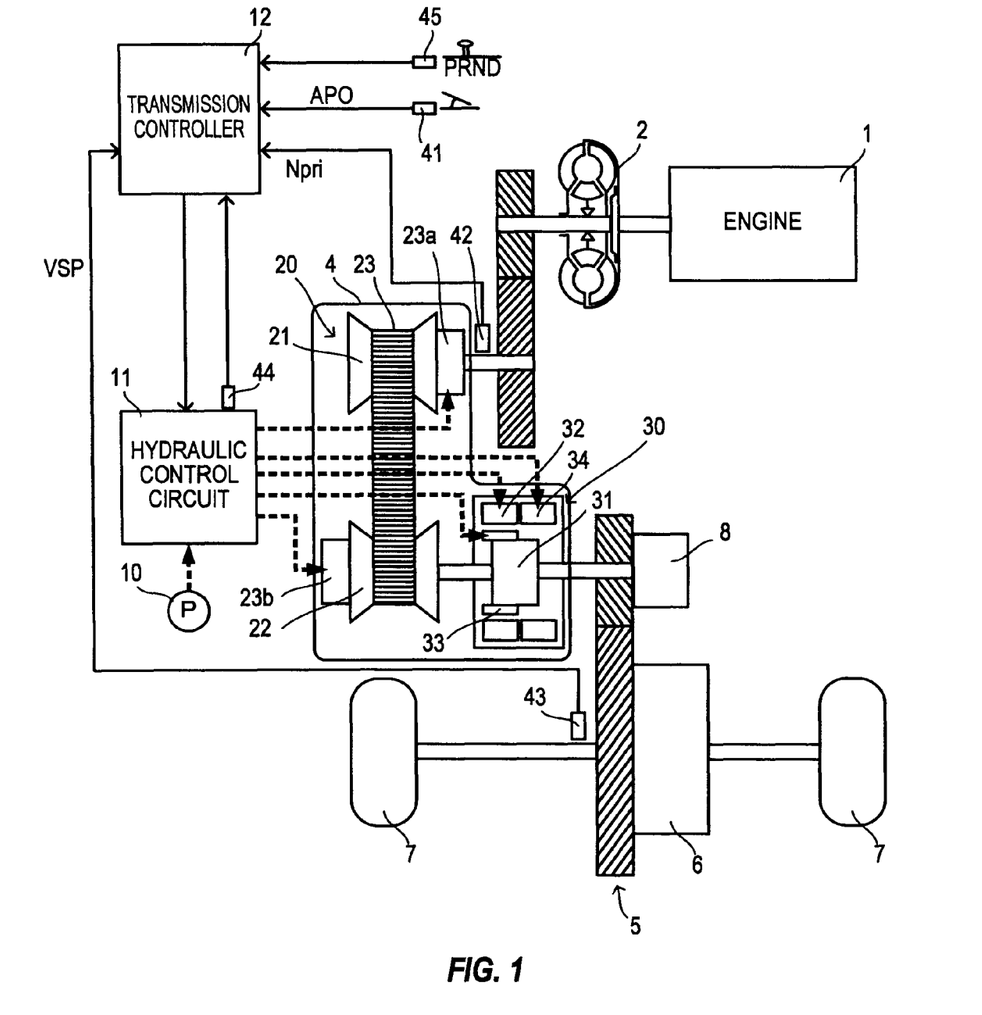
FIG. 1 is a schematic diagram showing a vehicle installed with a continuously variable transmission according to an embodiment of this invention.

FIG. 1 is a schematic diagram showing a vehicle installed with a continuously variable transmission according to an embodiment of this invention. The vehicle includes an engine 1 as a power source. An output rotation of the engine 1 is transmitted to drive wheels 7 via a torque converter 2 including a lockup clutch, a first gear train 3, a continuously variable transmission (to be referred to simply as a "transmission 4" hereafter), a second gear train 5, and a final reduction gear 6. The second gear train 5 is provided with a parking mechanism 8 which locks an output shaft of the transmission 4 mechanically during parking so that the output shaft of the transmission 4 cannot rotate.

Further, the vehicle is provided with an oil pump 10 that is driven using a part of the power of the engine 1, a hydraulic control circuit 11 that regulates an oil pressure from the oil pump 10 and supplies the regulated oil pressure to respective sites of the transmission 4, and a transmission controller 12 that controls the hydraulic control circuit 11.

The transmission 4 includes a belt continuously variable speed change mechanism (to be referred to hereafter as a "variator") 20, and a subtransmission mechanism 30 provided in series with the variator 20. Here, "provided in series" means that the variator 20 and the subtransmission mechanism 30 are provided in series on a power transmission path extending from the engine 1 to the drive wheels 7. The subtransmission mechanism 30 may be connected to an output shaft of the variator 20 directly, as in this example, or via another speed change/power transmission mechanism (a gear train, for example). Alternatively, the subtransmission mechanism 30 may be connected to a front stage (an input shaft side) of the variator 20.

The variator 20 includes a primary pulley 21, a secondary pulley 22, and a V belt 23 wrapped around the pulleys 21, 22. The pulleys 21, 22 respectively include a fixed conical plate, a movable conical plate disposed relative to the fixed conical plate such that respective sheave surfaces thereof oppose each other, thereby forming a V groove, and hydraulic cylinders 23a, 23b provided on a back surface of the movable conical plate so as to displace the movable conical plate in an axial direction. When oil pressure supplied to the hydraulic cylinders 23a, 23b is regulated, a width of the V groove varies, causing a contact radius between the V belt 23 and the respective pulleys 21, 22 to vary, and as a result, the speed ratio of the variator 20 is varied continuously.

The subtransmission mechanism 30 is a speed change mechanism having two-forward speed and single-reverse speed. The subtransmission mechanism 30 includes a Ravigneaux planetary gear mechanism 31 in which carriers of two planetary gears are coupled, and a plurality of frictional engagement elements (a Low brake 32, a High clutch 33, and a Rev brake 34) which are connected to a plurality of rotary elements constituting the Ravigneaux planetary gear mechanism 31 so as to modify rotation states thereof. When engagement/disengagement states of the respective frictional engagement elements 32 to 34 are modified by regulating oil pressures supplied to the respective frictional engagement elements 32 to 34, the gear position of the subtransmission mechanism 30 is changed.

For example, when the Low brake 32 is engaged and the High clutch 33 and Rev brake 34 are disengaged, the gear position of the subtransmission mechanism 30 becomes a first speed. When the High clutch 33 is engaged and the Low brake 32 and Rev brake 34 are disengaged, the gear position of the subtransmission mechanism 30 becomes a second speed in which the speed ratio is smaller than that of the first speed. Further, when the Rev brake 34 is engaged and the Low brake 32 and High clutch 33 are disengaged, the gear position of the subtransmission mechanism 30 becomes the reverse speed. In the following description, the terms "the transmission 4 is in a low speed mode" and "the transmission 4 is in a high speed mode" will be used to indicate that the gear position of the subtransmission mechanism 30 corresponds to the first speed and the second speed, respectively.

Figure 2:
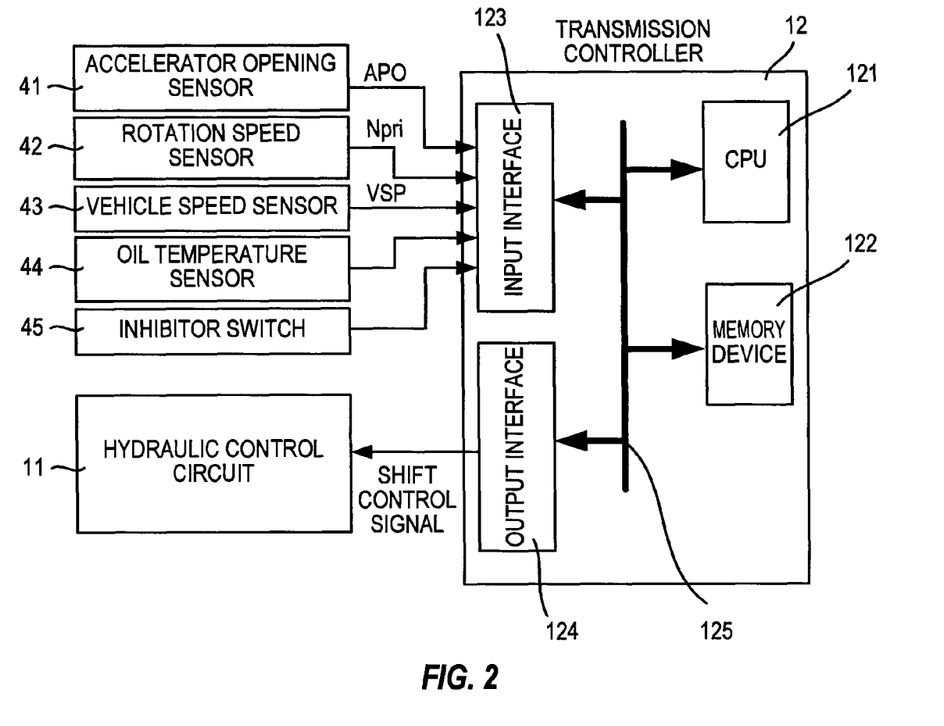
FIG. 2 is a view showing an internal constitution of a transmission controller.

As shown in FIG. 2, the transmission controller 12 is constituted by a CPU 121, a memory device 122 including a RAM and a ROM, an input interface 123, an output interface 124, and a bus 125 that connects these components to each other.

An output signal from an accelerator opening sensor 41 that detects an accelerator opening APO, which is an operating amount of an accelerator pedal, an output signal from a rotation speed sensor 42 that detects an input rotation speed of the transmission 4 (=a rotation speed of the primary pulley 21;

to be referred to hereafter as a "primary rotation speed Npri"), an output signal from a vehicle speed sensor 43 that detects a vehicle speed VSP, an output signal from an oil temperature sensor 44 that detects an oil temperature TMP of the transmission 4, an output signal from an inhibitor switch 45 that detects a position of a select lever, and so on are input into the input interface 123.

The memory device 122 stores a shift control program (FIG. 4) of the transmission 4, and a shift map (FIG. 3) used by the shift control program. The CPU 121 reads and executes the shift control program stored in the memory device 122, generates a shift control signal by implementing various types of calculation processing on the various signals input via the input interface 123, and outputs the generated shift control signal to the hydraulic control circuit 11 via the output interface 124. Various values used during the calculation processing executed by the CPU 121 and results of the calculation processing are stored in the memory device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, regulate the oil pressure generated by the oil pump 10 to a required oil pressure, and supply the regulated oil pressure to the respective sites of the transmission 4. Thus, the speed ratio of the variator 20 and the gear position of the subtransmission mechanism 30 are changed, whereby a shift is performed in the transmission 4.

Figure 3:
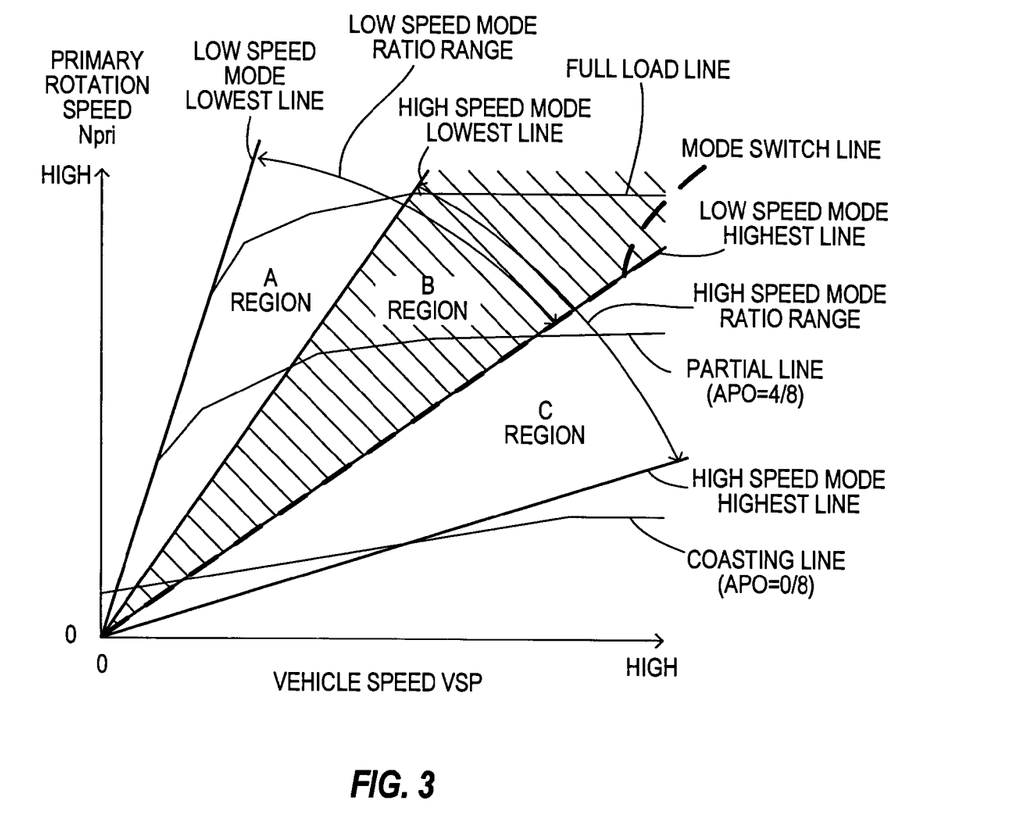
FIG. 3 is a view showing an example of a shift map.

FIG. 3 shows an example of the shift map stored in the memory device 122. The transmission controller 12 controls the variator 20 and the subtransmission mechanism 30 in accordance with operating conditions of the vehicle (in this embodiment, the vehicle speed VSP, the primary rotation speed Npri, and the accelerator opening APO) while referring to the shift map.

On the shift map, operating points of the transmission 4 are defined by the vehicle speed VSP and the primary rotation speed Npri. An incline of a line linking the operating point of the transmission 4 and a zero point in a lower left corner of the shift map corresponds to the speed ratio of the transmission 4 (an overall speed ratio obtained by multiplying the speed ratio of the subtransmission mechanism 30 by the speed ratio of the variator 20; to be referred to hereafter as a "through speed ratio"). On this shift map, similarly to a shift map of a conventional belt continuously variable transmission, a shift line is set for each accelerator opening APO, and a shift is performed in the transmission 4 in accordance with a shift line selected according to the accelerator opening APO. For the sake of simplicity, FIG. 3 shows only a full load line (a shift line when the accelerator opening APO=8/8), a partial line (a shift line when the accelerator opening APO=4/8), and a coasting line (a shift line when the accelerator opening APO=0/8).

When the transmission 4 is in the low speed mode, the transmission 4 can be shifted between a low speed mode Lowest line obtained by setting the speed ratio of the variator 20 at the Lowest speed ratio and a low speed mode Highest line obtained by setting the speed ratio of the variator 20 at the Highest speed ratio. Namely, in the low speed mode, the operating point of the transmission 4 moves within an A region and a B region in the figure. When the transmission 4 is in the high speed mode, on the other hand, the transmission 4 can be shifted between a high speed mode Lowest line obtained by setting the speed ratio of the variator 20 at the Lowest speed ratio and a high speed mode Highest line obtained by setting the speed ratio of the variator 20 at the Highest speed ratio. Namely, in the high speed mode, the operating point of the transmission 4 moves within the B region and a C region in the figure.

The speed ratio in each gear position of the subtransmission mechanism 30 is set such that the speed ratio corresponding to the low speed mode Highest line (the low speed mode Highest speed ratio) is smaller than the speed ratio corresponding to the high speed mode Lowest line (the high speed mode Lowest speed ratio). In so doing, a through speed ratio range of the transmission 4 that can be realized in the low speed mode (referred to as a "low speed mode ratio range" in the figure) partially overlaps a through speed ratio range of the transmission 4 that can be realized in the high speed mode (referred to as a "high speed mode ratio range" in the figure), and therefore, when the operating point of the transmission 4 is in the B region sandwiched between the high speed mode Lowest line and the low speed mode Highest line, the transmission 4 can select either the low speed mode or the high speed mode.

Furthermore, a mode switch line at which the subtransmission mechanism 30 performs a shift is set on the shift map to overlap the low speed mode Highest line. The through speed ratio corresponding to the mode switch line (to be referred to hereafter as a "mode switch speed ratio mRatio") is set at an equal value to the low speed mode Highest speed ratio. The reason for setting the mode switch line in this manner is because an input torque input into the subtransmission mechanism 30 decreases as the speed ratio of the variator 20 decreases and thus shift shock during a shift in the subtransmission mechanism 30 can be suppressed.

When the operating point of the transmission 4 crosses the mode switch line, or in other words when an actual value of the through speed ratio (to be referred to hereafter as an "actual through speed ratio Ratio") passes the mode switch speed ratio mRatio, the transmission controller 12 performs a mode switch shift. Hereinafter, "the operation point of the transmission 4 crosses the mode switch line" is expressed as "the through speed ratio of the transmission 4 passes the mode switch line".

In the mode switch shift, the transmission controller 12 performs a shift in the subtransmission mechanism 30 and varies the speed ratio of the variator 20 in an opposite direction to a variation direction of the speed ratio of the subtransmission mechanism 30. The reason for causing the speed ratio of the variator 20 to vary in the opposite direction to the speed ratio variation direction of the subtransmission mechanism 30 during a mode switch shift is to ensure that a driver does not experience an unpleasant feeling due to input rotation variation caused by a step in the actual through speed ratio Ratio.

More specifically, when the actual through speed ratio Ratio of the transmission 4 passes the mode switch line (the mode switch speed ratio mRatio) from the Low side to the High side, the transmission controller 12 changes the gear position of the subtransmission mechanism 30 from the first speed to the second speed (a 1-2 shift) and varies the speed ratio of the variator 20 to the Low side.

Conversely, when the actual through speed ratio Ratio of the transmission 4 passes the mode switch line (the mode switch speed ratio mRatio) from the High side to the Low side, the transmission controller 12 changes the gear position of the subtransmission mechanism 30 from the second speed to the first speed (a 2-1 shift) and varies the speed ratio of the variator 20 to the High side.

Figure 4:
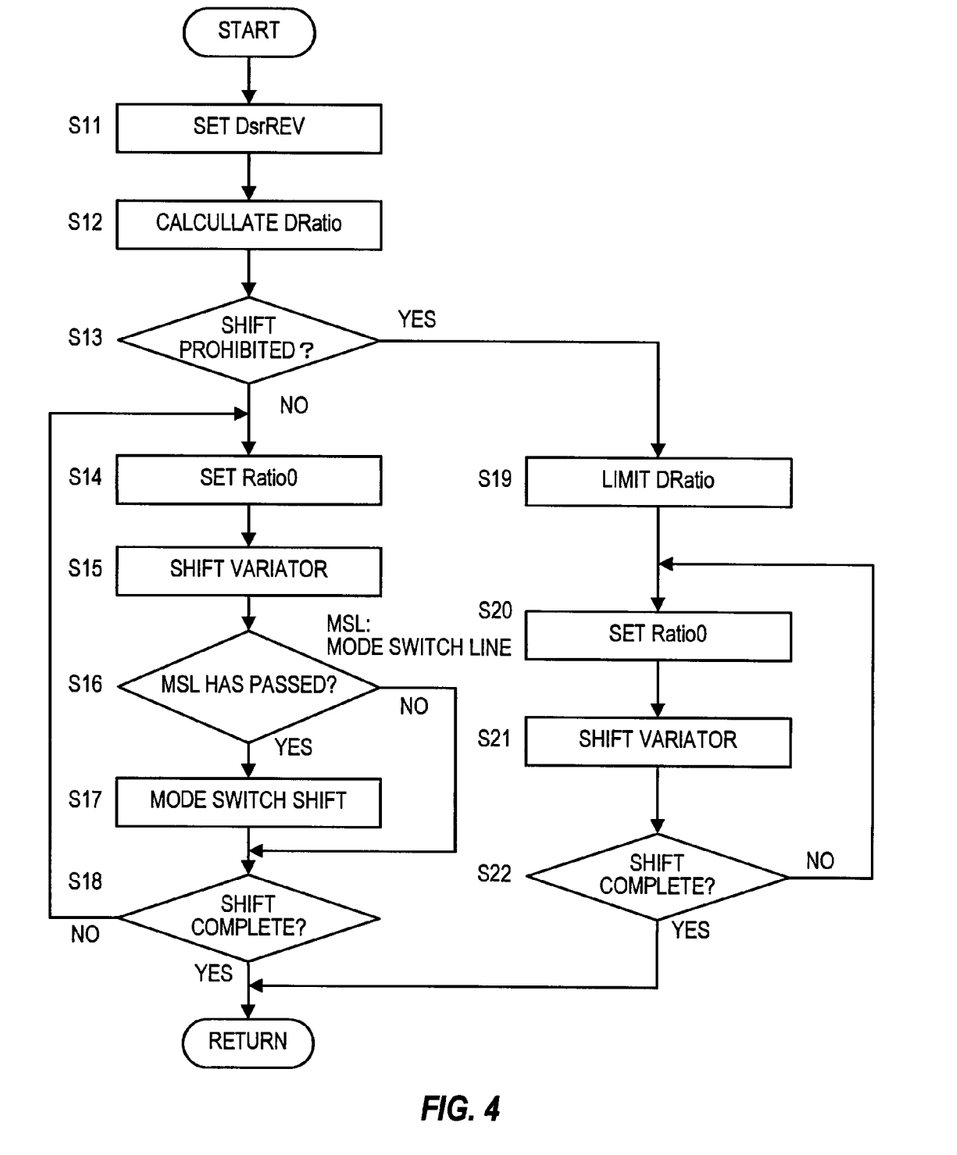
FIG. 4 is a flowchart showing the content of a shift control program executed by the transmission controller.

FIG. 4 shows an example of the shift control program stored in the memory device 122 of the transmission controller 12. The specific content of the shift control executed by the transmission controller 12 will now be described with reference to FIG. 4.

In S11, the transmission controller 12 searches the shift map shown in FIG. 3 for a value corresponding to the current vehicle speed VSP and accelerator opening APO, and sets this value as a destination primary rotation speed DsrREV. The destination primary rotation speed DsrREV is a primary rotation speed to be reached at the current vehicle speed VSP and accelerator opening APO, and serves as a steady-state target value of the primary rotation speed.

In S12, the transmission controller 12 calculates a destination through speed ratio DRatio by dividing the destination primary rotation speed DsrREV by the vehicle speed VSP and a final reduction ratio fRatio of the final reduction gear 6. The destination through speed ratio DRatio is a through speed ratio to be reached at the current vehicle speed VSP and accelerator opening APO, and serves as a steady-state target value of the through speed ratio.

In S13, the transmission controller 12 determines whether or not shifts are prohibited in the subtransmission mechanism 30. For example, when the oil temperature TMP of the transmission 4 is lower than a predetermined low temperature, the transmission controller 12 prohibits 1-2 shifts in the subtransmission mechanism 30 and promotes an increase in the oil temperature TMP by maintaining the primary rotation speed Npri at a high level. Further, when the oil temperature TMP of the transmission 4 is higher than a predetermined high temperature, the transmission controller 12 prohibits 2-1 shifts in the subtransmission mechanism 30 and promotes a reduction in the oil temperature TMP by maintaining the primary rotation speed Npri at a low level. The transmission controller 12 also prohibits shifts in the subtransmission mechanism 30 when an abnormality such as a shift malfunction or a shift breakdown occurs in the subtransmission mechanism 30, for example.

When it is determined in S13 that shifts are not prohibited in the subtransmission mechanism 30, the processing advances to S14.

In S14, the transmission controller 12 sets a target through speed ratio Ratio0 for varying the actual through speed ratio Ratio from the value thereof at the start of the shift to the destination through speed ratio DRatio at a predetermined transient response. The target through speed ratio Ratio0 is a transient target value of the through speed ratio. The predetermined transient response is a first order lag response, for example, which is set such that the target through speed ratio Ratio0 gradually approaches the destination through speed ratio DRatio. The actual through speed ratio Ratio is calculated whenever required on the basis of the current vehicle speed VSP and primary rotation speed Npri (likewise hereafter).

In S15, the transmission controller 12 controls the actual through speed ratio Ratio to the target through speed ratio Ratio0. More specifically, the transmission controller 12 calculates a target speed ratio vRatio0 of the variator 20 by dividing the target through speed ratio Ratio0 by the speed ratio of the subtransmission mechanism 30, and controls the variator 20 such that an actual speed ratio vRatio of the variator 20 becomes the target speed ratio vRatio0. As a result, the actual through speed ratio Ratio follows the destination through speed ratio DRatio at the predetermined transient response.

In S16, the transmission controller 12 determines whether or not the actual through speed ratio Ratio has passed the mode switch line, namely it has passed the mode switch speed ratio mRatio. When an affirmative determination is made, the processing advances to S17, and when a negative determination is made, the processing advances to S18.

In S17, the transmission controller 12 performs a mode switch shift. In the mode switch shift, the transmission controller 12 performs a shift in the subtransmission mechanism 30 (when the current gear position is the first speed, a 1-2 shift and when the current gear position is the second speed, a 2-1 shift), and varies the actual speed ratio vRatio of the variator 20 in the opposite direction to the speed ratio variation direction of the subtransmission mechanism 30 to ensure that a step does not occur in the actual through speed ratio Ratio before and after the mode switch shift.

In S18, the transmission controller 12 determines whether or not the shift is complete. More specifically, the transmission controller 12 determines that the shift is complete when a deviation between the actual through speed ratio Ratio and the destination through speed ratio DRatio is smaller than a predetermined value. When it is determined that the shift is complete, the processing is terminated, and when it is determined that the shift is not complete, the processing of S14 to S18 is repeated until it is determined that the shift is complete.

Meanwhile, when it is determined in S13 that shifts are prohibited in the subtransmission mechanism 30, the processing advances to S19.

In S19, the transmission controller 12 limits the destination through speed ratio DRatio to a range that can be realized only by a shift in the variator 20.

More specifically, when the gear position of the subtransmission mechanism 30 corresponds to the first speed, the transmission controller 12 sets a lower limit of the destination through speed ratio DRatio at the low speed mode Highest speed ratio. Thus, when the destination through speed ratio DRatio is smaller than the low speed mode Highest speed ratio, the destination through speed ratio DRatio is limited to the low speed mode Highest speed ratio. Further, when the gear position of the subtransmission mechanism 30 corresponds to the second speed, the transmission controller 12 sets an upper limit of the destination through speed ratio DRatio at the high speed mode Lowest speed ratio. Thus, when the destination through speed ratio DRatio is larger than the high speed mode Lowest speed ratio, the destination through speed ratio DRatio is limited to the high speed mode Lowest speed ratio.

The processing of S20 to S22 is identical to the processing of S14, S15 and S18. In other words, the transmission controller 12 calculates the target through speed ratio Ratio0 on the basis of the destination through speed ratio DRatio, and controls the variator 20 such that the actual through speed ratio Ratio becomes the target through speed ratio Ratio0. The transmission controller 12 then determines whether or not the shift is complete. When it is determined that the shift is complete, the processing is terminated, and when it is determined that the shift is not complete, the processing of S20 to S22 is repeated.

Next, actions and effects of the above shift control will be described.

When shifts are prohibited in the subtransmission mechanism 30, the destination through speed ratio DRatio may be set outside a speed ratio range that can be realized only by a shift in the variator 20 in cases where the accelerator pedal is depressed sharply, the accelerator pedal is released sharply from a depressed state, and so on.

If, at this time, the target through speed ratio Ratio0 is set on the basis of the destination through speed ratio DRatio and the actual through speed ratio Ratio is controlled without taking into account the shift prohibition in the subtransmission mechanism 30, the shift operation is interrupted at the point where the speed ratio of the variator 20 reaches the Lowest speed ratio or the Highest speed ratio, and as a result, a shift speed varies rapidly to zero, leading to shift shock.

However, according to the shift control described above, the destination through speed ratio DRatio is limited to a speed ratio range that can be realized only by a shift in the variator 20 when shifts are prohibited in the subtransmission mechanism 30 (S19). The target through speed ratio Ratio0 is then set on the basis of the limited destination through speed ratio DRatio, and the variator 20 is controlled on the basis thereof (S20 to S22).

Hence, according to the shift control described above, when shifts are prohibited in the subtransmission mechanism 30, the variation width of the actual through speed ratio Ratio narrows but the shift operation is not interrupted, and therefore the actual through speed ratio Ratio shifts to the limited destination through speed ratio DRatio at the predetermined transient response. As a result, shift shock due to rapid variation in the shift speed does not occur.

Figure 5A:
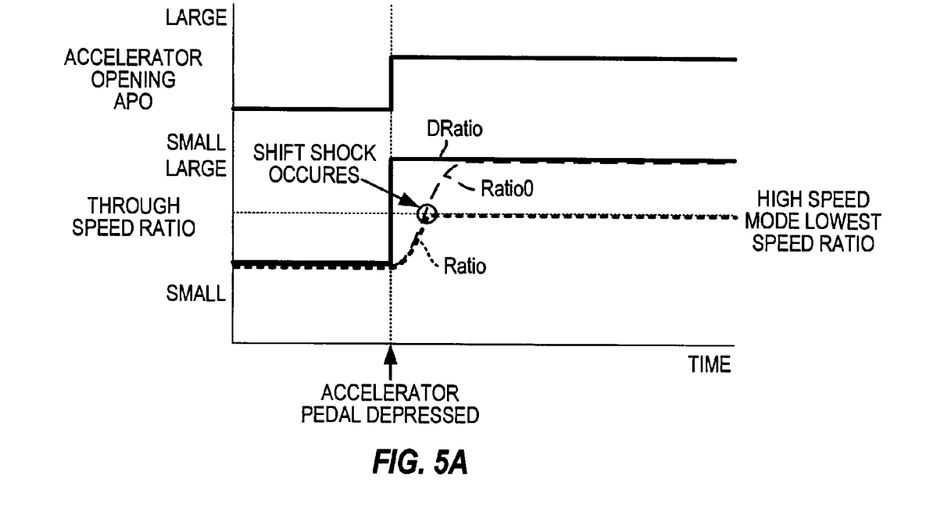
FIG. 5A is a timing chart for explaining actions and effects of comparative example.
Figure 5B:
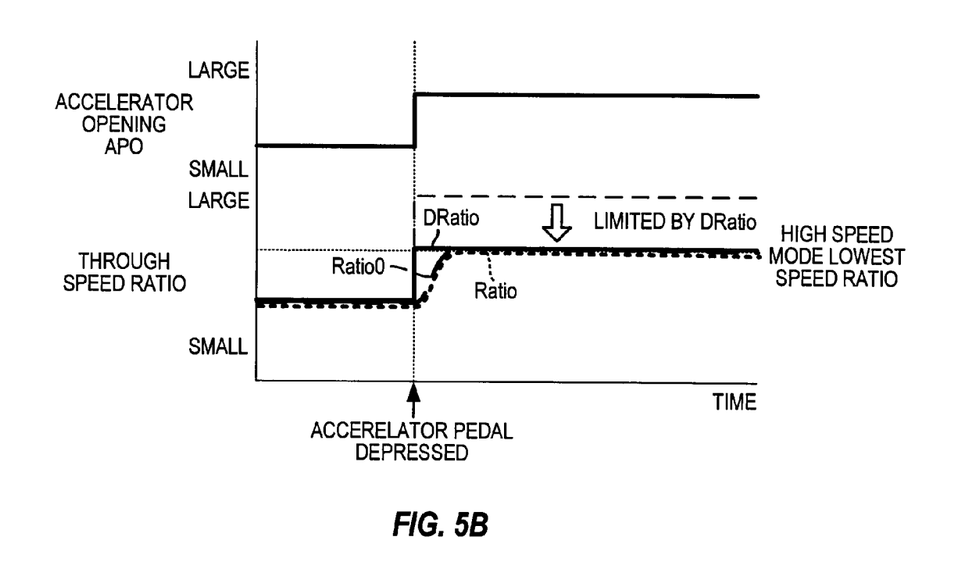
FIG. 5B is a timing chart for explaining actions and effects of an example of application of this invention.

FIGS. 5A and 5B show states in which the accelerator pedal is depressed sharply while the vehicle is traveling in the high speed mode. FIG. 5A shows a comparative example in which the processing (S13, S19 to S22) performed in the above shift control when shifts are prohibited in the subtransmission mechanism 30 is omitted, and FIG. 5B shows an example in which the shift control of this invention is applied. In both cases, it is assumed that shifts are prohibited in the subtransmission mechanism 30.

When the accelerator pedal is depressed sharply, the destination through speed ratio DRatio increases in a step fashion in accordance therewith.

In the comparative example, the target through speed ratio Ratio0 is set to follow the destination through speed ratio DRatio at the predetermined transient response, and the actual through speed ratio Ratio is controlled to the target through speed ratio Ratio0. However, since shifts are prohibited in the subtransmission mechanism 30, the shift operation is interrupted at the point where the speed ratio of the variator 20 reaches the Lowest speed ratio, and as a result, the shift speed varies rapidly, leading to shift shock.

In the example of application of this invention, on the other hand, the destination through speed ratio DRatio is limited to the high speed mode Lowest speed ratio, and the target through speed ratio Ratio0 is set to follow the limited destination through speed ratio DRatio (=the high speed mode Lowest speed ratio). The variator 20 is then controlled such that the actual through speed ratio Ratio reaches the target through speed ratio Ratio0. The limited destination through speed ratio DRatio can only be realized by a shift in the variator 20, and therefore the shift operation is not interrupted midway. As a result, shift shock such as that of the comparative example does not occur.

Hence, according to the shift control described above, shift shock in a continuously variable transmission including a subtransmission mechanism can be prevented even when shifts are prohibited in the subtransmission mechanism, and as a result, the drivability of the vehicle can be improved.

An embodiment of this invention was described above, but this embodiment is merely one example of application of this invention, and the technical scope of this invention is not limited to the specific constitutions of the embodiment.

For example, in the above embodiment, the mode switch line is set to overlap the low speed mode Highest line, but the mode switch line may be set to overlap the high speed mode Lowest line or set between the high speed mode Lowest line and the low speed mode Highest line. The mode switch line may be comprised of polygonal line similar to a shift line for a conventional step automatic transmission.

Further, in the above embodiment, the subtransmission mechanism 30 is a speed change mechanism having the first speed and second speed gear positions as forward gear positions, but the subtransmission mechanism 30 may be a speed change mechanism having three or more gear positions as forward gear positions.

Furthermore, the subtransmission mechanism 30 is formed using a Ravigneaux planetary gear mechanism, but is not limited to this constitution. For example, the subtransmission mechanism 30 may be constituted by a combination of a normal planetary gear mechanism and frictional engagement elements, or by a plurality of power transmission paths formed from a plurality of gear trains having different speed ratios, and frictional engagement elements for switching the power transmission paths.

Further, the V belt 23 may be comprised of a metal ring and a plurality of metal elements, but the V belt 23 may be comprised of an endless chain. The term "belt" in claims covers various types of belt which can be used for transmitting rotation between pulleys in a continuously variable transmission.

Further, the hydraulic cylinders 23a, 23b are provided as actuators for displacing the movable conical plates of the pulleys 21, 22 in the axial direction, but the actuators may be driven electrically rather than hydraulically.

Further, in the above embodiment, the power source is comprised of the engine 1, but an electric motor or a combination of an engine and an electric motor may be used as the power source.

This application claims priority based on Japanese Patent Application No. 2009-79646, filed with the Japan Patent Office on Mar. 27, 2009, the entire content of which is incorporated into this specification.

What is claimed is:

1. A continuously variable transmission installed in a vehicle, comprising:
    a variator capable of varying a speed ratio continuously;
    a subtransmission mechanism provided in series with the variator and having a first gear position and a second gear position, the second gear position having a smaller speed ratio than the first gear position, as forward gear positions;
    a through speed ratio setting unit which sets, on the basis of an operating condition of the vehicle, an overall through speed ratio of the variator and the subtransmission mechanism to be realized in accordance with the operating condition;
    a shift control unit which controls at least one of the speed ratio of the variator and the gear position of the subtransmission mechanism on the basis of the through speed ratio; and
    a shift prohibition determining unit which determines whether or not shifts have been prohibited in the subtransmission mechanism on the basis of the operating condition of the vehicle,
    wherein, when shifts are determined to be prohibited in the subtransmission mechanism, the through speed ratio setting unit limits the through speed ratio to a speed ratio range that can be realized only by a shift in the variator.

2. The continuously variable transmission as defined in claim 1, wherein the through speed ratio setting unit limits the through speed ratio to a low speed mode Highest speed ratio, in a case where shifts are determined to be prohibited in the subtransmission mechanism, the gear position of the subtransmission mechanism is the first gear position, and the through speed ratio is smaller than the low speed mode Highest speed ratio, the low speed mode Highest speed ratio being a through speed ratio obtained when the speed ratio of the variator is a Highest speed ratio and the gear position of the subtransmission mechanism is the first gear position.

3. The continuously variable transmission as defined in claim 1, wherein the through speed ratio setting unit limits the through speed ratio to a high speed mode Lowest speed ratio, in a case where shifts are determined to be prohibited in the subtransmission mechanism, the gear position of the subtransmission mechanism is the second gear position, and the through speed ratio is larger than the high speed mode Lowest speed ratio, the high speed mode Lowest speed ratio being a through speed ratio obtained when the speed ratio of the variator is a Lowest speed ratio and the gear position of the subtransmission mechanism is the second gear position.

* * * * *